United States Patent
Lee et al.

(10) Patent No.: US 9,160,761 B2
(45) Date of Patent: Oct. 13, 2015

(54) SELECTION OF A COUNTERMEASURE

(71) Applicants: Hewlett-Packard Development Company, L.P., Houston, TX (US); ARIZONA BOARD OF REGENTS, Scottsdale, AZ (US)

(72) Inventors: Jung Gun Lee, Mountain View, CA (US); Chun-Jen Chung, Chandler, AZ (US); Pankaj Kumar Khatkar, Tempe, AZ (US); Tianyi Xing, Tempe, AZ (US); Dijiang Huang, Chandler, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 13/955,552

(22) Filed: Jul. 31, 2013

(65) Prior Publication Data
US 2015/0040228 A1    Feb. 5, 2015

(51) Int. Cl.
*G06F 11/00*    (2006.01)
*H04L 29/06*    (2006.01)

(52) U.S. Cl.
CPC ........ *H04L 63/1433* (2013.01); *H04L 63/1441* (2013.01)

(58) Field of Classification Search
CPC . H04L 63/1416; H04L 41/12; H04L 63/0209; H04L 63/0227; H04L 63/0263; H04L 63/1425; H04L 63/1433; H04L 63/1491; H04L 63/20; G06F 2009/45591; G06F 2009/45595; G06F 21/53; G06F 21/552; G06F 21/554; G06F 21/56; G06F 21/577; G06F 2221/2101; G06F 9/45533; G06F 9/45558; G06F 21/00; G06F 21/51; G06F 21/564; G06F 11/3612; G08B 19/005; G08B 15/02; G08B 13/00
USPC ...................................... 726/22–25; 340/541
See application file for complete search history.

(56) References Cited

U.S. PATENT DOCUMENTS

| | | | |
|---|---|---|---|
| 2009/0178131 A1 | 7/2009 | Hudis et al. | |
| 2012/0092163 A1* | 4/2012 | Hart ............................. | 340/541 |
| 2012/0265976 A1 | 10/2012 | Spiers et al. | |
| 2013/0133068 A1 | 5/2013 | Jiang | |
| 2013/0298230 A1* | 11/2013 | Kumar et al. ................... | 726/22 |

FOREIGN PATENT DOCUMENTS

| | | |
|---|---|---|
| CN | 102833228 A | 12/2012 |
| WO | WO-2012153054 A1 | 11/2012 |

OTHER PUBLICATIONS

Doyle, L., SDN and Security; Impact of Network Security in the SDN-enabled Data Center, (Web Page), Sep. 20, 2012, 3 pps.
Shin, S. et al., Cloudwatcher; Network Security Monitoring Using Openflow in Dynamic Cloud Networks, (Research Paper), Sep. 20, 2012, 6 pps.

(Continued)

*Primary Examiner* — Thanhnga B Truong
(74) *Attorney, Agent, or Firm* — Hewlett-Packard Patent Department

(57) ABSTRACT

Examples disclose a method, executable by a processor, to assign a metric of vulnerability to a virtual machine. Based on the metric of vulnerability, the method places the virtual machine into a detection phase. Additionally, the examples disclose the method is to receive an alert corresponding to the virtual machine and based this received alert, the method implements a countermeasure.

20 Claims, 8 Drawing Sheets

(56) References Cited

OTHER PUBLICATIONS

A. Roy et al., "Attack countermeasure trees (ACT): towards unifying the constructs of attack and defense trees," Security and Communication Networks, 2010 (74 pages).
B. Joshi et al, "Securing cloud computing environment against DDoS attacks", Computer Communications and Informatics, Jan. 2012, pp. 1-5.
Cimatti et al., "NuSMV: A new symbolic model checker." [Online]. Available: http://afrodite.itc.it:1024/nusmv/ Mar. 2000 (6 pages).
Citrix, Citrix XenServer 5, 2008 (2 pages).
Cloud Security Alliance, "Top threats to cloud computing v1.0," [Online]. Available: https://cloudsecurityalliance.org/topthreats/csathreats.v1.0.pdf, Mar. 2010 (14 pages).
CVE International, Common Vulnerabilities and Exposures—The Standard for Information Security Vulerability Names, at least as early as Jul. 29, 2013 (2 pages).
G. Gu et al., "BotHunter: detecting malware infection through IDS-driven dialog correlation," in Proceedings of 16th USENIX Security Symposium on USENIX Security Symposium, ser. SS'07. Berkeley, CA, USA: USENIX Association, 2007, pp. 12:1-12:16.
G. Gu et al., "BotMiner: clustering analysis of network traffic for protocol- and structure-independent botnet detection," in Proceedings of the 17th conference on Security symposium, ser. SS'08. Berkeley, CA, USA: USENIX Association, 2008, (16 pages).
G. Gu et al., "BotSniffer: detecting botnet command and control channels in network traffic," in Proceedings of 15th Ann. Network and Distributed Sytem Security Symposium, ser. NDSS'08, 2008 (27 pages).
H. Takabi et al., "Security and privacy challenges in cloud computing environments," IEEE Security & Privacy, vol. 8, No. 6, pp. 24-31, Dec. 2010.
K. Kwon et al, "Network security management using ARP spoofing", 2004 (8 pages).
L. Wang et al., "Using attack graphs for correlating, hypothesizing, and predicting intrusion alerts," Computer Communications, vol. 29, No. 15, pp. 2917-2933, Sep. 2006.
M. Armbrust et al., "A view of cloud computing," Commun. ACM, vol. 53, No. 4, pp. 50-58, Apr. 2010.
M. Frigault et al., "Measuring network security using bayesian Network-Based attack graphs," in Computer Software and Applications, 2008, COMPSAC '08. 32nd Annual IEEE Inter-national, Aug. 2008 (7 pages).
N. McKeown et al., "OpenFlow: enabling innovation in campus networks," SIGCOMM Comput. Commun. Rev., vol. 38, No. 2, pp. 69-74, Apr. 2008.
N. Gude et al., "NOX: towards an operating system for networks," SIGCOMM Comput. Commun. Rev., vol. 38, No. 3, pp. 105-110, Jul. 2008.
N. Poolsappasit et al, "Dynamic security risk management using Bayesian attack graphs", Feb. 2012 (14 pages).
Nist, "National Vulnerability Database, NVD" dated at least as early as Jun. 28, 2013 (3 pages).
O. Database, Open source vulnerability database (OVSDB) dated at least as early as Jun. 22, 2013 (2 pages).
O. Sheyner et al., "Automated generation and analysis of attack graphs," in 2002 IEEE Symposium on Security and Privacy, 2002, Proceedings. IEEE, 2002 (12 pages).
Open Networking Foundation, "Software-defined networking: The new norm for networks," ONF White Paper, Apr. 2012 (12 pages).
OpenFlow—What is OpenFlow? 2011 (3 pages).
OpenVSwitch—An Open Virtual Switch, Production Quality, Multilayer Open Virtual Switch at least as early as Jun. 18, 2013 (1 page).
P. Mell et al., NIST Interagency Report 7435, "Common vulnerability scoring system (CVSS) and its Applicability to Federal Agency Systems," Aug. 2007 (33 pages).
R. Sadoddin et al, "Alert correlation survey: framework and techniques", 2006 (10 pages).
R. Sherwood et al., "FlowVisor: A network virtualization layer," Deutsche Telekom Inc. R&D Lab, Stanford University, Nicira Networks, Tech. Rep. OPENFLOW-TR-2009-1, Oct. 2009 (15 pages).
Roy et al., "Scalable optimal countermeasure selection using implicit enumeration on attack countermeasure trees", 2012 (12 pages).
S. Jajodia, "Topological analysis of network attack vulnerability," in Proceedings of the 2nd ACM symposium on Information, computer and communications security, ser. ASIACCS '07. New York, NY, USA: ACM, 2007 (20 pages).
S. Roschke et al, "A flexible and efficient alert correlation platform for distributed IDS", Sep. 2010 (8 pages).
S.H. Ahmadinejad et al, "A hybrid model for correlating alerts of known and unknown attack scenarios and updating attack graphs", Computer Networks V.55(9), Jun. 2011 (20 pages).
Sebastian Roschke et al., "A new alert correlation algorithm based on attack graph," published in Proceedings of the 4th International Conference on Computational Intelligence in Security for Information Systems (CISIS 2011), Torremolinos, Spain, Jun. 2011 (10 pages).
X. Ou et al., "MulVAL: a logic-based network security analyzer," in Proceedings of the 14th conference on USENIX Security Symposium—vol. 14. Berkeley, CA, USA: USENIX Association, 2005 (16 pages).
X. Ou et al.,"A scalable approach to attack graph generation," in Proceedings of the 13th ACM conference on Computer and communications security, ser. CCS '06. New York, NY, USA: ACM, 2006 (10 pages).
Z. Duan, et al., "Detecting spam zombies by monitoring outgoing messages," Apr. 2012 (9 pages).

\* cited by examiner

SELECTION OF A COUNTERMEASURE

GOVERNMENT LICENSE RIGHTS

This invention has been made with government support under grant N00014-10-1-0714, awarded by the Office of Naval Research. The government has certain rights in the invention.

BACKGROUND

Attackers in a cloud network may compromise virtual machines to deploy collaborated attacks, such as distributed denial of service (DDoS). These attacks compromise virtual machines within the cloud network by flooding resources of a targeted system, such as a web server. Flooding resources of the targeted system, prevents connections with other virtual machines within the cloud network.

BRIEF DESCRIPTION OF THE DRAWINGS

In the accompanying drawings, like numerals refer to like components or blocks. The following detailed description references the drawings, wherein.

DETAILED DESCRIPTION

Attackers may exploit vulnerabilities on virtual machines within a networking system to deploy attacks. System administrators may detect and deploy a countermeasure to the attack in a centralized manner. Utilizing the centralized manner, may not work effectively as users may install vulnerable applications and other files on their respective virtual machine. This may contribute to vulnerabilities within the network security and may be difficult to minimize the impact of an attack to the users of the virtual machines. Additionally, the networking system may include an infrastructure of multiple connected virtual machines which enables the virtual machines to share resources within the networking system. However, this may make it easier for an attacker to deploy the attack by affecting multiple virtual machines through the shared resources.

To address these issues, examples disclosed herein provide an efficient infrastructure to protect a networking system from attacks. The examples disclose an attack analyzer to assign a metric of vulnerability to a virtual machine. The metric of vulnerability indicates a likelihood of attack on the virtual machine, this enables the networking system to identify the more vulnerable virtual machines within the networking system to prevent those vulnerable virtual machines from being compromised within the networking system.

Additionally, the examples disclose the networking system places the virtual machine into a detection phase based on the metric of vulnerability. The detection phase monitors the selected virtual machines which may be more vulnerable to attacks than other virtual machines. This lowers power consumption as the identified vulnerable virtual machines are monitored rather than the additional virtual machines which may not be vulnerable.

Furthermore, some examples provided herein identify a countermeasure based on a received alert during the detection phase. Identifying the countermeasure based on the received alert strengthens the security within the networking system in a practical manner as the countermeasure may be selected and instantaneously deployed. Additionally, selecting the countermeasure may strengthen security by countering attempts to compromise virtual machines.

In another example discussed herein, provides a network switch to reconfigure the networking system. Reconfiguring the networking system by programming the virtual switch enables the networking system to manipulate traffic flow in and out of the virtual machine. Such examples may also quarantine the compromised virtual machine to mitigate the effects of the attack on the networking system.

In summary, examples disclosed herein provide an efficient infrastructure to identify vulnerable virtual machines within a networking system and to prevent these machines from being compromised. Additionally, the examples disclosed herein enhance security by countering attempts to compromise the vulnerable virtual machines.

Figure 1:
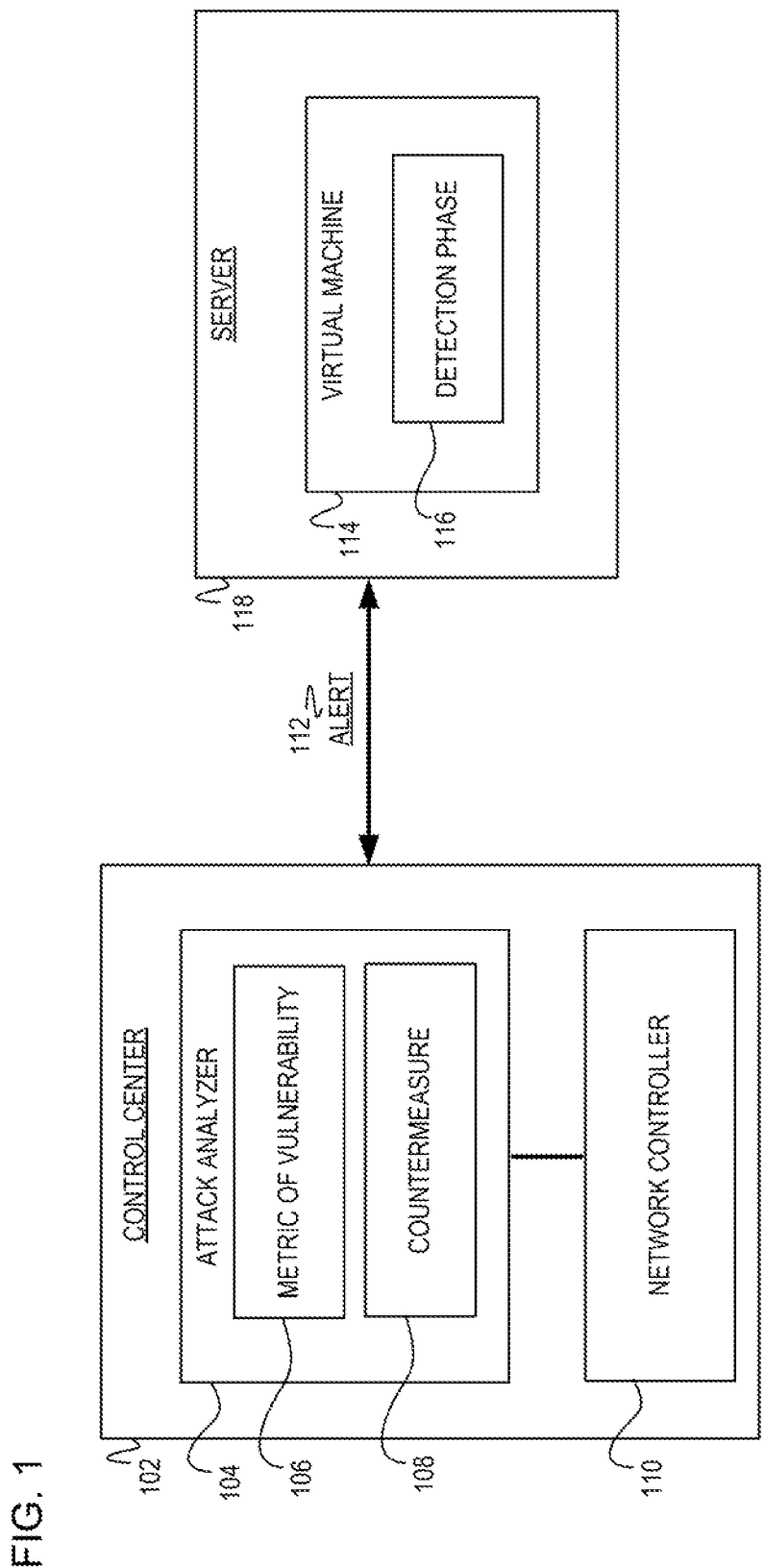
FIG. 1 is a block diagram of an example control center including an attack analyzer and a network controller, the attack analyzer includes assigning a metric of vulnerability and selecting a countermeasure.

Referring now to the figures, FIG. 1 is a block diagram of an example networking system including a control center 102 and a server 118. The control center 102 includes a network controller 110 and an attack analyzer 104 to assign a metric of vulnerability 106 and select a countermeasure 108 based on an alert 112 received from a detection engine operating on the server 118. The server 118 includes a virtual machine 114 which may be placed into a detection phase 116 for the detection engine to monitor a flow of traffic in and out of the virtual machine 114. The networking system represents a cloud type computing system in which the control center 102 and the server 118 may provide resources, such as Internet to users. For example, the networking system may be represented by an Open Sources Interconnection (OSI) model system that standardizes the internal functions of a communication system by partitioning the networking system into abstraction layers. In other implementations, the networking system may include wide area network (WAN), local area network (LAN), Ethernet, optic cable network, or other type of networking system. During a service attack, an attacker (not illustrated) attempts to overtake the virtual machine 114 for resources within the networking system, such as bandwidth. As such, efforts by the attacker may interrupt or suspend services within the networking system. This leads to overtaking the resources in the networking system which may become unavailable for its intended users.

The control center 102 is a centralized control center within the networking system to manage resources and functions of the networking system. The network controller 110 and the attack analyzer 104 are connected to virtual switches (not illustrated) to the server 118. Although FIG. 1 illustrates the control center 102 as including components 104 and 110, implementations of the control center 102 should not be limited to this illustration as the control center 102 may include other components. For example, the control center 102 may include a processor to execute the attack analyzer 104 and the network controller 110. Implementations of the control center 102 include a computing system, electronic device, computing device, microprocessor, microchip, chipset, electronic circuit, semiconductor, microcontroller, central processing unit (CPU), or other type of computing system to manage resources and functions of the networking system.

The server 118 is a computing system to provide network services, such as data storage and/or Internet connectivity. As such, implementations of the server 118 include a Local Area Network (LAN) server, web server, cloud server, network server, file server, or other type of computing device capable of including the virtual machine 114. The virtual machine 114 is an implemented abstraction of underlying hardware, which is presented to an application layer of the networking system. In this manner, the virtual machine 114 emulates the computer architecture and/or the functions of a computing device.

The attack analyzer 104 is a module which assigns the metric of vulnerability 106 and determines whether the virtual machine 114 should be placed into the detection phase 116. The attack analyzer 104 also selects the countermeasure 108 based on the alert 112 received from the detection engine on the server 118, which monitors traffic flow in and out of the virtual machine 114. Implementations of the attack analyzer 104 include a set of instructions, instruction, process, operation, logic, algorithm, technique, logical function, firmware, and or software executable by the control center 102 to assign the metric of vulnerability 106 and select the countermeasure 108.

The metric of vulnerability 106 is assigned by the attack analyzer 104 to indicate a level of susceptibility of the virtual machine 114 to an attack. The metric of vulnerability 106 is a value which indicates how susceptible a particular virtual machine may be to an attack. The metric of vulnerability is based on a base score as provided by a standardized vulnerability database and/or according to connections to other virtual machines (not illustrated). For example, the standardized vulnerability database may include a National Vulnerability Database by the National Institute of Standards and Technology (NIST). Assigning the metric of vulnerability 106 to the virtual machine 114 enables the networking system to track those virtual machines which may be more susceptible to attack. In a further implementation, the attack analyzer 104 may periodically scan the virtual machine 114 to vulnerabilities to establish the assignment of the metric of vulnerability 106.

The detection phase 116 is an inspection state in which the detection engine associated with the server 118 may monitor traffic in and out of the virtual machine 114. Depending on the assigned metric of vulnerability 106, the attack analyzer 104 may communicate with the server 118 to place the virtual machine 118 into the detection phase. Implementations of the detection phase 116 may include a deep packet inspection to inspect the traffic in and out of the virtual machine 114.

The alert 112 is generated from the detection engine when monitoring traffic flow in and out of the virtual machine 114. The detection engine associated with the server 118 monitors the virtual machine 114 and transmits the alert 112 to the attack analyzer 104. The alert 112 signals a various condition or state of the virtual machine 114 during inspection of data packets in and out of the virtual machine 112. For example, the alert 112 may indicate a precondition of the virtual machine 114 and/or consequence of an exploit of the attacker on the virtual machine 114. In this manner, the alert 112 indicates the type of vulnerability of the virtual machine 114, such as whether the virtual machine is currently being compromised or has previously been compromised. Implementations of the type of vulnerability may include stable, vulnerable, exploited, and zombie. These implementations are discussed in detail in later figures.

The countermeasure 108 is selected by the attack analyzer 104 based on the alert 112 during the detection phase 116 of the virtual machine 114. Based on the alert 112 received by the attack analyzer 104, the selected countermeasure 108 may be more or less intrusive to the virtual machine 114 to interfere with the flow of traffic in and out of the virtual machine 114. For example, the virtual machine 114 may be under the control of the attacker and as such, the attack analyzer 104 may divert the flow of traffic to prevent traffic to and from the virtual machine 114. This example illustrates a more intrusive countermeasure than a countermeasure which may continue to monitor the traffic flow in and out of the virtual machine 114. In another implementation, the selected countermeasure 108 may include reconfiguring the network system by programming a virtual switch connected to the virtual machine 114. In this implementation, the selected countermeasure 108 may isolate the virtual machine 114 to manipulate the traffic flow in and out of the virtual machine 114.

The network controller 110 receives the countermeasure 108 selected by the attack analyzer 104 for implementation at the virtual machine 114. The network controller 110 may transmit a signal to the detection engine at the server 118 to implement a particular countermeasure at the virtual machine 114. In one implementation, the network controller 110 may include a hardware device and as such, implementations may include a microchip, chipset, electronic circuit, microprocessor, semiconductor, microcontroller, central processing unit (CPU), or other programmable device capable implementing the selected countermeasure 108. In another implementation, the network controller 110 may include a set of instructions, instruction, process, operation, logic, technique, logical function, firmware, and or software executable by the control center 102 to implement the selected countermeasure 108.

Figure 2A:
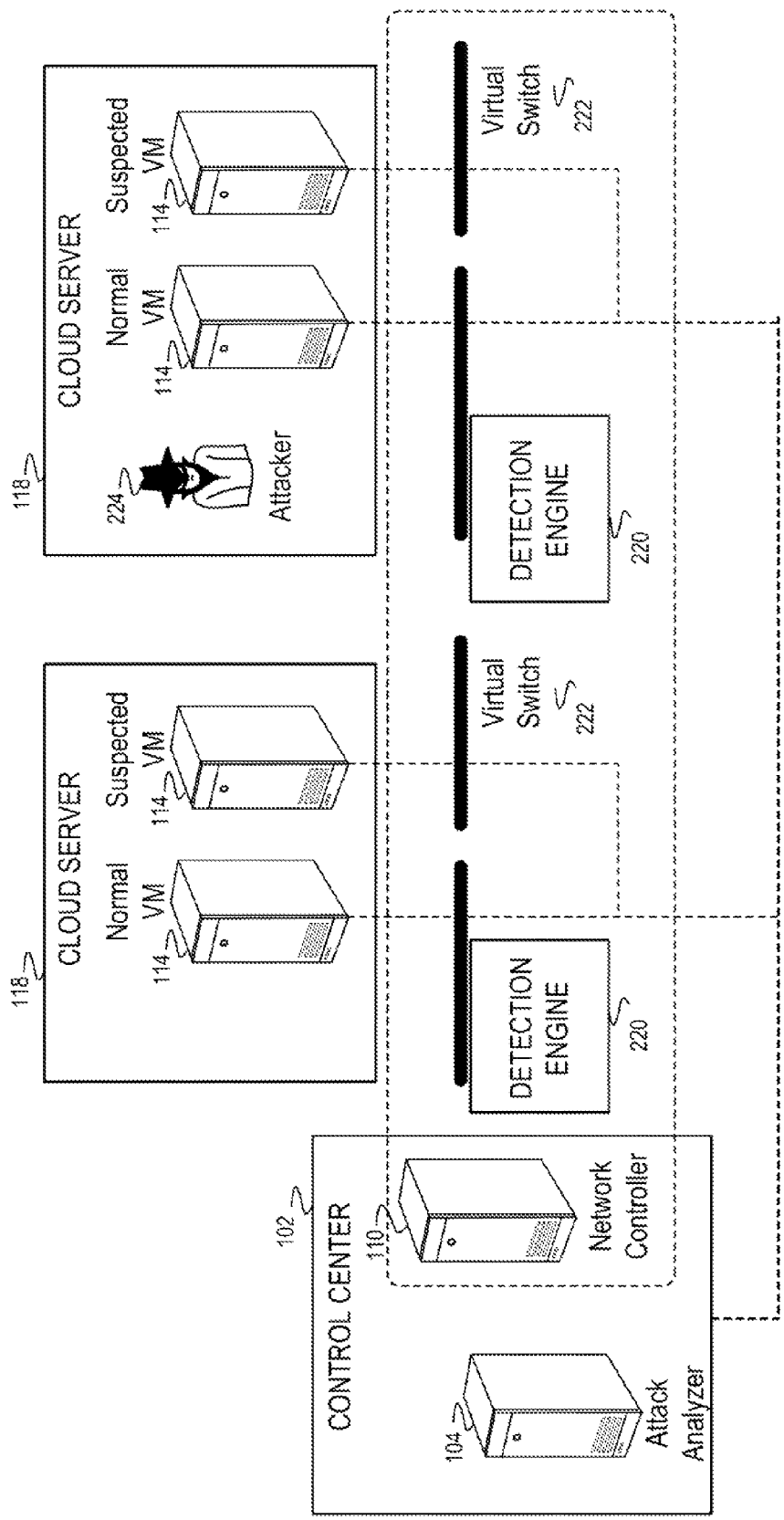
FIG. 2A is a diagram of an example networking system with a control center including a network controller, an attack analyzer, a detection engine, and a cloud server associated with multiple virtual machines.

FIG. 2A is a block diagram of an example networking system including a detection engine 220 in communication with the control center 102 and the cloud server 118. The detection engine 220 monitors the various virtual machines 114 to determine whether an attacker 224 has compromised at least one virtual machine 114. Additionally, the networking system illustrates a virtual switch 222 which may be utilized to reconfigure the networking system by manipulating traffic flow in and/or out of the virtual machines 114.

The detection engine 220 is a network intrusion detection agent associated with each cloud server 118 to analyze cloud traffic from the virtual machines 114 when placed into the detection phase. In one implementation, the detection engine 220 may be associated with the network controller 110 to communicate when to implement one of the virtual switches 222 corresponding to one of the virtual machines 114. In another implementation, the detection engine 220 may periodically scan the virtual machines 114 for vulnerability information for transmission to the attack analyzer 104. The attack analyzer 104 utilizes this information in assigning the metric of vulnerability to determine whether to place the particular virtual machine 114 into the detection phase by the detection engine 220. Additionally, although FIG. 2 illustrates the detection engine 220 as independent from the control center 102 and the cloud server 118, this was done for illustration purposes as not for limiting the implementations. For example, the detection engine 220 may be considered part of the control center 102 or part of the cloud server 118.

The virtual switch 222 is programmed by the network controller 110 to manipulate traffic flow to the various virtual machines 114 as the selected countermeasure. In some examples, the virtual switch 222 is considered an Ethernet type switch with embedded security controls within it which enable the switch 222 to operate within virtual environments. The virtual switch 222 provides security measures such as isolation, control, and content inspection between virtual machines 114. In one implementation, the virtual switch 222 manipulates the flow of traffic to and/or from at least one of the virtual machines 114 by isolating that virtual machine 114 from the networking system.

The attacker 224 illustrates an attack service that may occur on at least one of the cloud servers 118. The attacker 224 may overtake one of the virtual machines 114 to generate a distributed denial of service (DDoS) among the multiple virtual machines 114. Assigning the metric of vulnerability by the attack analyzer 104, the networking system may track the suspected virtual machines from the normal operating virtual machines 114 to monitor the suspected virtual machines 114. Monitoring the suspected virtual machines 114, the networking system may determine which virtual machines 114 are exploited by the attacker 224.

Figure 2B:
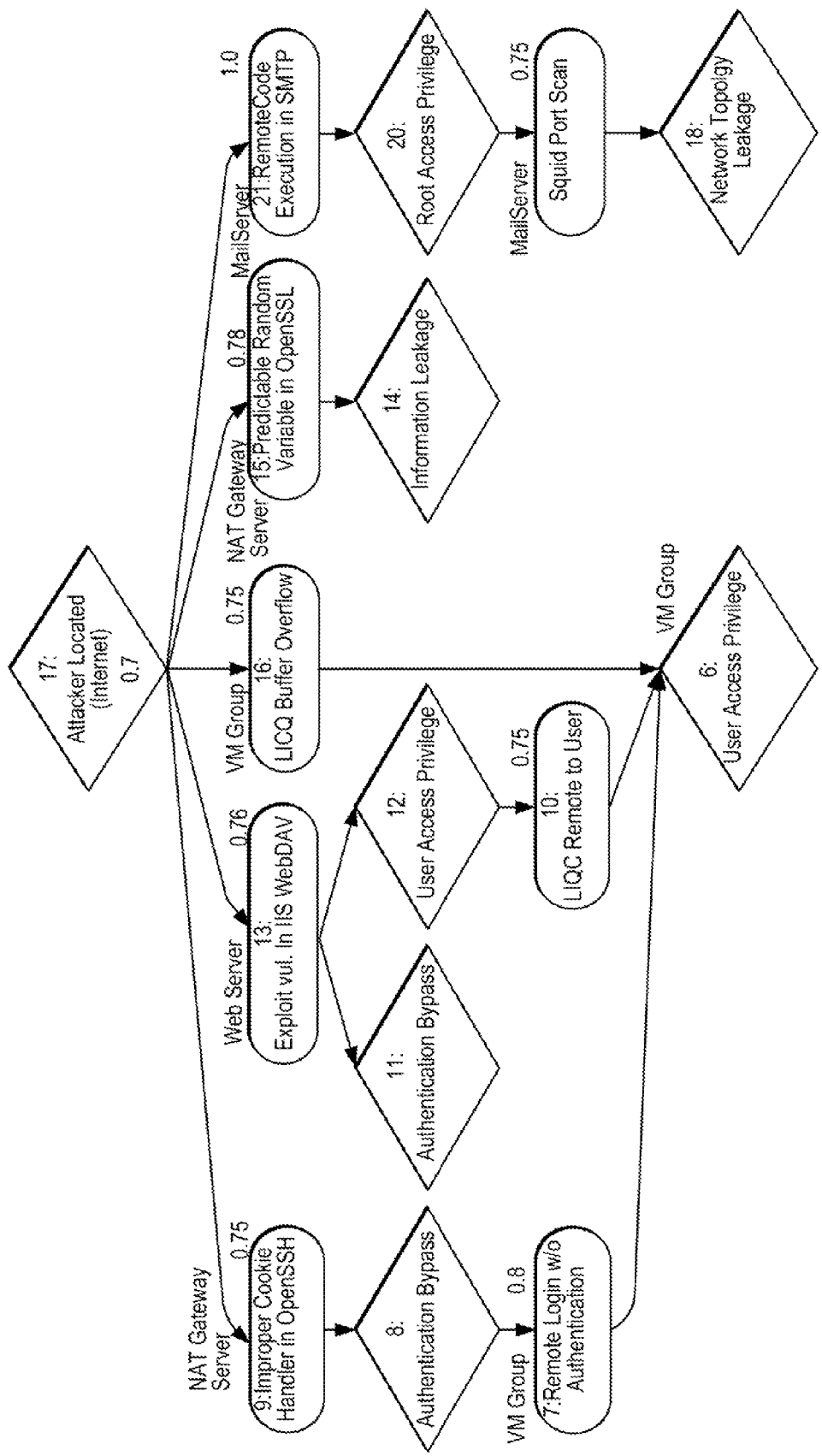
FIG. 2B is an example diagram representing a metric of vulnerability and alert corresponding to a virtual machine.

FIG. 2B is a diagram of an example scenario attack graph which may be utilized to assign a metric of vulnerability to each virtual machine. Using the attack graph in FIG. 2B, is an implementation for evaluating the various security risks posed by an attacker. The attack graph illustrates information about a cloud server, virtual machine topology, and virtual machine configuration information. The virtual machine topology includes the arrangements of the various virtual machines in the networking system. The configuration information includes which virtual machines may be connected to other virtual machines. In this regard, the vulnerability of a given virtual machine may affect the vulnerability of a connected virtual machine. Additionally, determining the source of a compromised virtual machine enables the networking system to predict a path of the attack.

Additionally. FIG. 2B represents the assignment of the metric of vulnerability to various virtual machines as each virtual machine is assigned the metric of vulnerability. Each virtual machine diamond and rounded shape may include a condition of that virtual machine. The diamond shaped conditions represent actions that are being performed by that virtual machine, the rounded shaped conditions represent a vulnerability of that virtual machine. Each of the conditions illustrate an alert which may be transmitted to the attack analyzer. This further enables the networking system to predict the path of the attack.

The rounded shape conditions may be assigned the metric of vulnerability. The value at the top of the graph is a base score of vulnerability. This base score may be assigned according to an administrator or by a standardized database of vulnerabilities. The base score is used to obtain the metric of vulnerability. The metric of vulnerability is the value at the top of each rounded shape which are assigned to each virtual machine. This metric of vulnerability indicates how serious the vulnerability of the virtual machine. In one implementation, the higher the value, the more serious the vulnerability (e.g., the higher risk of exploitation).

Figure 3:
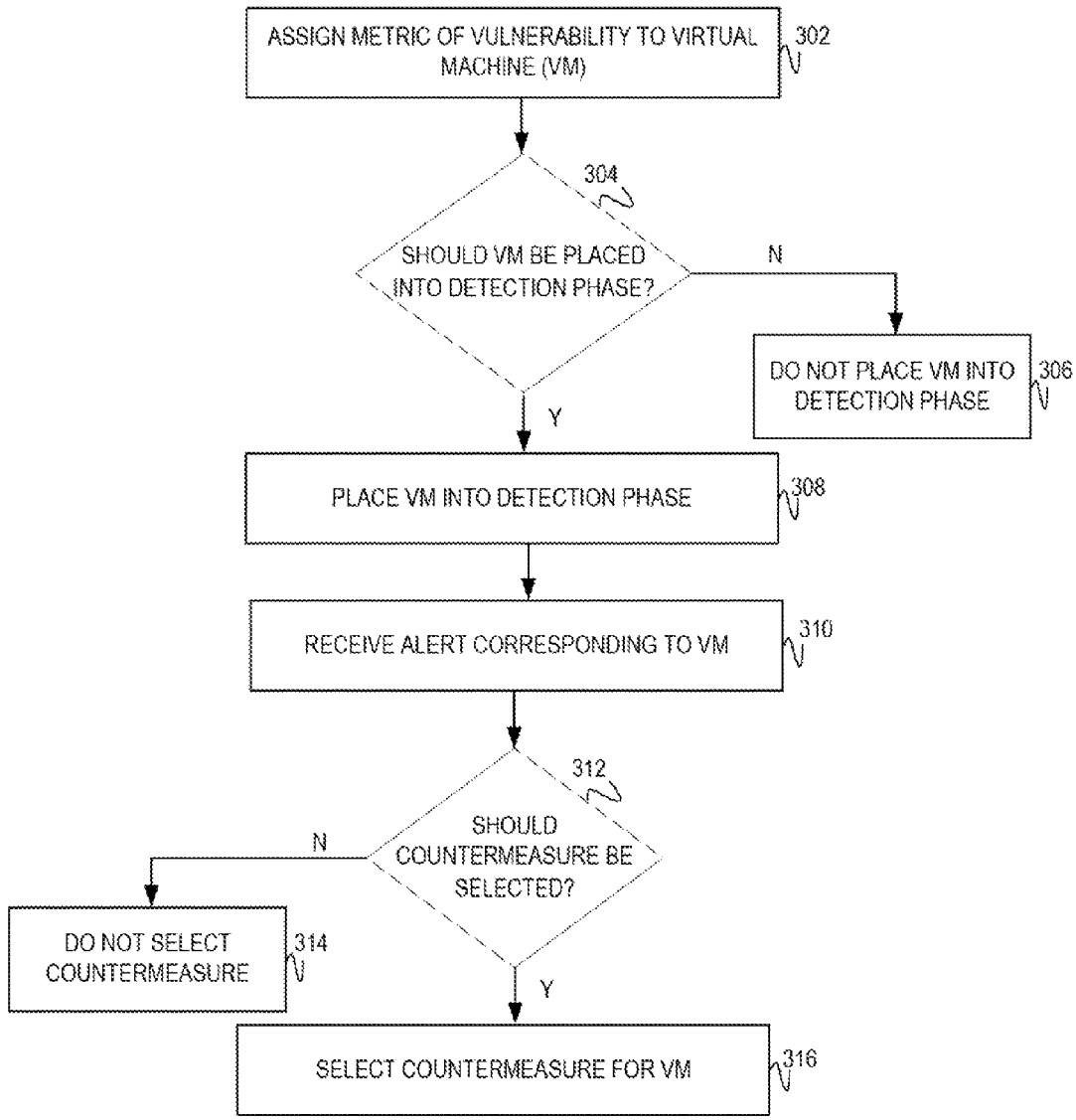
FIG. 3 is a flowchart of an example method to assign a metric of vulnerability to a virtual machine, determine whether the virtual machine should be placed into a detection phase, and select a countermeasure.

FIG. 3 is a flowchart of an example method to assign a metric of vulnerability to a virtual machine, determine whether the virtual machine should be placed into a detection phase, and select a countermeasure. In discussing FIG. 3, references may be made to the components in FIGS. 1-2B to provide contextual examples. In one implementation of FIG. 3, a processor associated with a control center 102 including a network controller 110 and an attack analyzer 104 collaborates communications to execute operations 302-316. Further, although FIG. 3 is described as implemented by a processor associated with the control center 102 as in FIG. 1, it may be executed on other suitable components. For example, FIG. 3 may be implemented in the form of executable instructions on a machine-readable storage medium 704 as in FIG. 7.

At operation 302, the attack analyzer assigns a metric of vulnerability to the virtual machine. The metric of vulnerability is a value to indicate how susceptible a particular virtual machine may be to an attack within a networking system. The metric of vulnerability may also include a designation which indicates the likelihood of attack to the virtual machine. In one implementation, the metric of vulnerability is based on a base score which may be assigned to each vulnerability as provided by a National Vulnerability Database by the National Institute of Standards and Technology (NIST). In another implementation, the metric of vulnerability may also be assigned according to the base score and the connectivity of the virtual machine to other virtual machines in the network. Assigning the metric of vulnerability based on the base score and the connectivity indicates the susceptibility of virtual machine according to the connection to other virtual machines rather than the virtual machine remaining unconnected. Assigning the metric of vulnerability to the virtual machine enables the networking system to track those virtual machines which may be more susceptible to attack and thus selecting the countermeasure to counter the attack on that virtual machine. In a further implementation, the attack analyzer may periodically scan the virtual machine to vulnerabilities to establish the assignment of the metric of vulnerability.

At operation 304, the attack analyzer may analyze the metric of vulnerability to determine whether the virtual machine should be placed into the detection phase. The metric of vulnerability is the value signaling to the attack analyzer the virtual machine is susceptible to an attack and/or has already been compromised. In one implementation, the attack analyzer may determine if the metric of vulnerability has reached a particular threshold, signaling the virtual machine should be monitored. If it is determined that virtual machine should not be placed into the detection phase, the method proceeds to operation 306. Otherwise, if the method determines the virtual machine should be placed into the detection phase, the method proceeds to operation 308.

At operation 306, the virtual machine is not placed into the detection phase. The metrics of vulnerability indicate the susceptibility of the virtual machine to attack. As such, if the metric of vulnerability reaches a particular threshold indication, the virtual machine may be monitored to determine whether the virtual machine has been compromised. If the metric of vulnerability has not reached the particular threshold, this may indicate that particular virtual machine is stable and may not be monitored for further analysis. In another implementation, the method may continue assigning metrics of vulnerability to multiple virtual machines.

At operation 308, the attack analyzer may transmit a communication to a detection engine to place the virtual machine into the detection phase. The detection phase is a state in which the virtual machine is monitored for traffic in and out of the virtual machine. In this regard, the detection phase detects suspicious and/or anomalous traffic and transmits the alert the attack analyzer for analysis. In one implementation, the detection engine monitors the packets of data through a deep packet inspection (DPI).

At operation 310, the detection engine monitors the virtual machine and generates an alert for transmission to the attack analyzer. In one implementation, the virtual machine is monitored and as such, alerts signaling various conditions or states of the virtual machine are transmitted to the attack analyzer. The alert may be a precondition of the virtual machine and/or consequence of an exploit of the attacker. In this manner, the alert indicates the type of vulnerability of the virtual machine, such as whether the virtual machine is currently being compromised or has previously been compromised. For example, the alert may include stable, vulnerable, exploited, and/or zombie. The stable alert is there are does not seem to exist any known vulnerabilities on the virtual machine. The vulnerable alert indicates the presence of at least one vulnerability on the virtual machine which remains unexploited by an attacker. The exploited alert indicates at least one vulnerability has been exploited by the attacker, further indicating the virtual machine has been compromised. The zombie alert indicates the virtual machine is under the control of the attacker. Based on the type of vulnerability corresponding to the alert received at operation 310, the method proceeds to operation 312 to determines whether the countermeasure should be selected.

At operation 312, the attack analyzer determines whether the countermeasure should be selected based on the alert received at operation 310. The alerts may include conditions of the virtual machine such as stable, vulnerable, exploited, and/or zombie. As such each of these alerts indicate to the attack analyzer whether to proceed to operation 314 and not select the countermeasure or to proceed to operation 316 and select the countermeasure. For example, a stable condition indicates to the attack analyzer to not select a countermeasure at operation 314 while the exploited alert indicates to the attack analyzer to select the countermeasure at operation 316 to prevent additional vulnerabilities being exploited.

At operation 314, the attack analyzer may determine the countermeasure should not be selected. This operation 314 may be dependent on the type of alert received at operation 310. The alert indicates the type of vulnerability experienced by the virtual machine in the detection phase.

At operation 316, the attack analyzer selects the countermeasure for the virtual machine. The countermeasure is selected to prevent the virtual machine from being compromised and/or preventing other virtual machines connected to a particular virtual machine from being attacked. In one implementation, the countermeasure may reconfigure the networking system through a virtual switch associated with the virtual machine. Programming the virtual switch as the selected countermeasure may exclude traffic flow in and out of the virtual machine to prevent further attacks on that virtual machine. In other implementations, the selected countermeasure may include redirecting the flow of traffic to and from the virtual machine, creating a rule to filter out particular data packets within the traffic flow, modifying an address, blocking a port associated with the virtual machine, etc.

Figure 4:
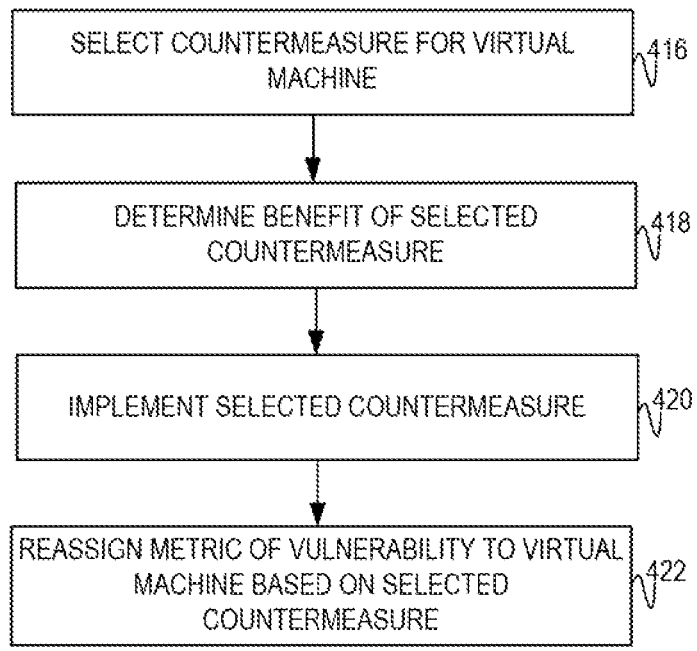
FIG. 4 is a flowchart of an example method to select a countermeasure for implementation on a virtual and to reassign a measurement of vulnerability based on the selected countermeasure.

FIG. 4 is a flowchart of an example method to select a countermeasure for a virtual machine for implementation and reassign a measurement of vulnerability based on the selected countermeasure. In discussing FIG. 4, references may be made to the components in FIGS. 1-2B to provide contextual examples. In one implementation of FIG. 4, a processor associated with a control center 102 including a network controller 110 and an attack analyzer 104 collaborates communications to execute operations 416-422. Further, although FIG. 4 is described as implemented by a processor associated with the control center 102 as in FIG. 1, it may be executed on other suitable components. For example, FIG. 4 may be implemented in the form of executable instructions on a machine-readable storage medium 704 as in FIG. 7.

At operation 416, the attack analyzer selects the countermeasure for the virtual machine. In one implementation, operations 302-314 are performed prior to operation 416 to select the countermeasure. In this implementation, the metric of vulnerability is assigned to the virtual machine, the virtual machine is placed into a detection phase, an alert is received, and the countermeasure is selected as at operation 416. Operation 416 may be similar in functionality to operation 316 as in FIG. 3.

At operation 418, the attack analyzer determines the benefit of the countermeasure selected at operation 416. The countermeasure may be initiated by the attack analyzer at operation 420 based on a cost-benefit analysis of an effectiveness of the countermeasure selected at operation 416. In one implementation, the countermeasure may include reconfiguring a virtual switch within the networking system which reconfigures the network system as the switch may prevent traffic to and from the virtual machine. In another implementation, the countermeasure may be selected using the Countermeasure Selection Approach (CSA) as illustrated below. In this implementation, the CSA presents how to select a preferred countermeasure for a given attack on the virtual machine. The input to the CSA includes an alert, a scenario attack graph including the metrics of vulnerability as in FIG. 2B, and a countermeasure selection pool (CM). The approach starts by selecting the virtual machine that corresponds to the alert ($v_{Alert}$) (line 1). Prior to selecting the countermeasure, the distance of $v_{Alert}$ to a target virtual machine is determined. The target virtual machine may be the virtual machine which may be targeted for protection through the use of the countermeasure (line 2). If the distance is smaller than a threshold value, the countermeasure selection is not updated, but rather the alert may be tracked to keep track of alerts within the networking system (line 3). For the source of the alert, the virtual machines connected to the source of the alert, are collected into a set T (line 6). Since the alert is generated after the attacker has performed the corresponding attacking on that virtual machine, the probability of $v_{Alert}$ set to 1 and the probabilities for each connected virtual machine is calculated (lines 7-8). The countermeasure options (CM) are selected and new probabilities calculated for each selected countermeasure (lines 13-14). The change in the probability of the target virtual machine (target_node) gives the benefit for the selected countermeasure using an equation (line 15).

Countermeasure Selection Approach

Require: Alert, G(E, V ), CM
1: Let $v_{Alert}$ = Source node of the Alert
2: if Distance_to_target($v_{Alert}$) < threshold then
3:      Update ACG
4:      return -continued

| Countermeasure Selection Approach |
| --- |
| 5: end if |
| 6: Let T = Descendant($v_{Alert}$) difference $v_{Alert}$ |
| 7: Set Pr($v_{Alert}$) = 1 |
| 8: calculate_risk_prob(T) |
| 9: Let benefit[T], [CM] = 0 |
| 10: for each t ∈ T do |
| 11:     for each cm ∈ CM do |
| 12:         if cm is applicable to t then |
| 13:             Pr(t) = Pr(t) * (1 − cm,effectiveness) |
| 14:             calculate risk prob(Descendant(t)) |
| 15:             benefit[t, cm] = ΔPr(target_node). |

At operation 420, a network controller implements the countermeasure selected at operation 416. In one implementation, the attack analyzer may signal to the network controller the selected countermeasure for implementation. The selected countermeasure is implemented from the network controller by a communication to a server associated with the virtual machine. In another implementation, the attack analyzer may signal to the network controller for implementing the selected countermeasure. In this operation, the attack analyzer and the network controller are connected to the virtual machine through a virtual switch. In a further implementation, the virtual switch may be programmed to prevent traffic to and from the virtual machine.

At operation 422, the attack analyzer reassigns the measurement of vulnerability based on the selected countermeasure implemented at operation 420. Reassigning the measurement of vulnerability may change a value of the metric based on the countermeasure. For example, if the countermeasure was selected to prevent the virtual machine from being compromised, the value of the metric may be reassigned accordingly to reflect the countermeasure. This enables the networking system to focus on other virtual machines which may be more susceptible to an attack. In one implementation, the reassignment of the metric is based on the type of countermeasure selected and implemented at operations 416 and 420. For example, the countermeasure may isolate the virtual machine from receiving and transmitting traffic, so the vulnerability measurement may be lower (e.g., less susceptible to an attack) than a countermeasure that may include blocking a port on the virtual machine. In this example, reassigning the metric value for the isolating the countermeasure may indicate the vulnerability of the virtual machine is less susceptible to the attack as it may no longer receive and transmit traffic as opposed to the countermeasure that may block the port associated with the virtual machine, but may still allow traffic in and out of the virtual machine through other associated ports.

Figure 5:
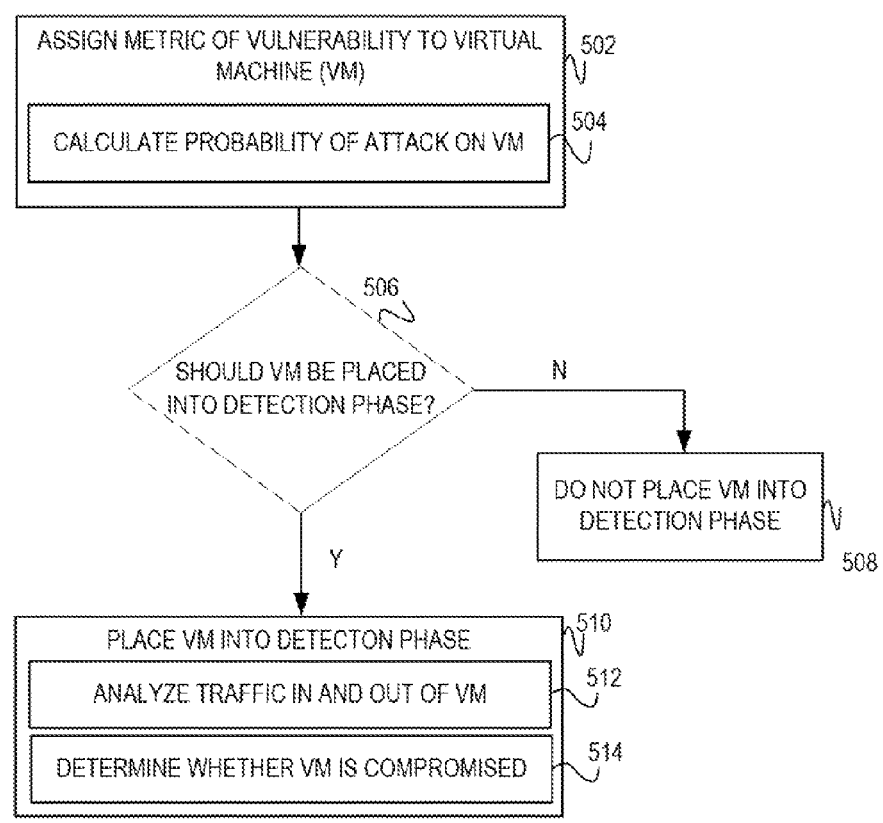
FIG. 5 is a flowchart of an example method to assign a metric of vulnerability to a virtual machine by calculating a probability of an attack on the virtual machine and placing the virtual machine into a detection phase by analyzing traffic in and out of the virtual machine.

FIG. 5 is a flowchart of an example method to assign a metric of vulnerability to a virtual machine by calculating a probability of an attack on the virtual machine. The method may place the virtual machine into a detection phase by analyzing traffic in and out of the virtual machine to determine whether the virtual machine has been compromised. In discussing FIG. 5, references may be made to the components in FIGS. 1-2B to provide contextual examples. In one implementation of FIG. 5, a processor associated with a control center 102 including a network controller 110 and an attack analyzer 104 collaborates communications to execute operations 502-514. Further, although FIG. 5 is described as implemented by a processor associated with the control center 102 as in FIG. 1, it may be executed on other suitable components. For example, FIG. 5 may be implemented in the form of executable instructions on a machine-readable storage medium 704 as in FIG. 7.

At operation 502, the attack analyzer assigns the metric of vulnerability to the virtual machine. In one implementation, the attack analyzer calculates the probability of the attack on the virtual machine as at operation 504. Operation 502 may be similar in functionality to operation 302 as in FIG. 3.

At operation 504, the attack analyzer calculates the probability of attack on the virtual machine. The probability of attack may be calculated based on the number of vulnerabilities on the virtual machine. In one implementation, the probability may be calculated from a base score by the Common Vulnerability Scoring System (CVSS). CVSS is a standardized vulnerability scoring system designed to provide an open and standardized approach for rating various vulnerabilities.

At operation 506, the attack analyzer determines whether the virtual machine should be placed into the detection phase. If the attack analyzer determines the virtual machine should not be placed into the detection phase, the method proceeds to operation 508. Otherwise, if the attack analyzer determines the virtual machine may be further analyzed in the detection phase, the method proceeds to operation 510. Operations 506-508 may be similar in functionality to operations 304-306 in FIG. 3.

At operation 510, the virtual machine is placed into the detection phase. In this operation, the attack analyzer determines the virtual machine should be placed into the detection phase as the metric of vulnerability may have reached a particular value indicating the susceptibility to being compromised by an attacker. Additionally, in operation 510, the attack analyzer may signal to a detection engine to place the virtual machine into a monitoring or detection phase. In this implementation, the method proceeds to operation 512.

At operations 512-514, the attack analyzer through the detection engine, may monitor traffic flow in and out of the virtual machine and determine if the virtual machine has been compromised. The detection engine may utilize a deep packet inspection of the data packets in the traffic flow. If these packets are sending repetitive requests to a server for resources, this may indicate the virtual machine has been compromised by the attacker and as such, the attack analyzer may select the countermeasure to combat the compromised virtual machine.

Figure 6:
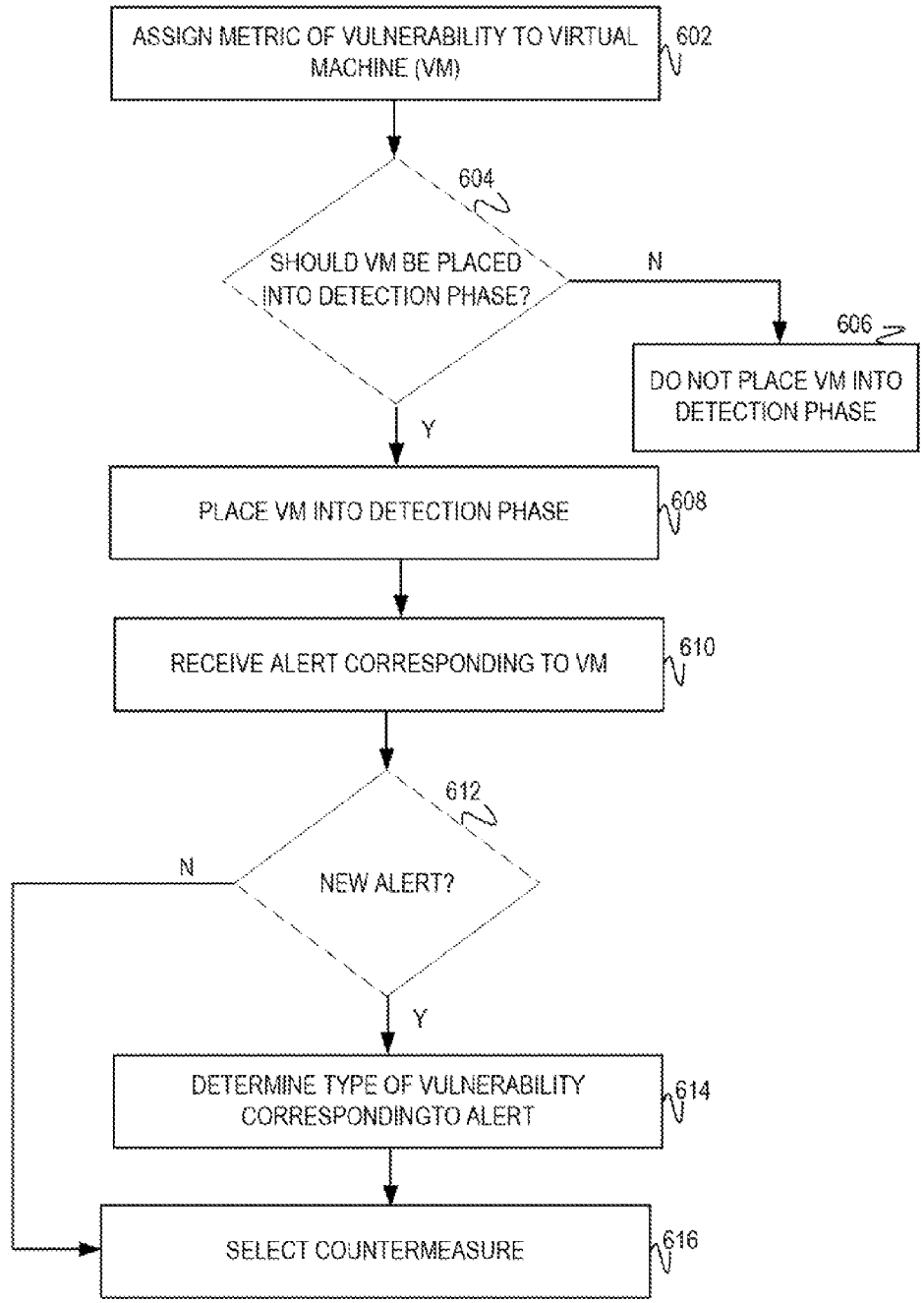
FIG. 6 is a flowchart of an example method to assign a metric of vulnerability to a virtual machine and receive an alert during a detection phase, the alert corresponds to a type of vulnerability on the virtual machine to then select a countermeasure.

FIG. 6 is a flowchart of an example method to assign a metric of vulnerability to a virtual machine and receive an alert during a detection phase, the alert corresponds to a type of vulnerability on the virtual machine. The method may then select a countermeasure. In discussing FIG. 6, references may be made to the components in FIGS. 1-2B to provide contextual examples. In one implementation of FIG. 6, a processor associated with a control center 102 including a network controller 110 and an attack analyzer 104 collaborates communications to execute operations 602-616. Further, although FIG. 6 is described as implemented by a processor associated with the control center 102 as in FIG. 1, it may be executed on other suitable components. For example, FIG. 6 may be implemented in the form of executable instructions on a machine-readable storage medium 704 as in FIG. 7.

At operations 602-608, the attack analyzer assigns the metric of vulnerability to the virtual machine and determines whether or not to place the virtual machine into the detection phase. Operations 602-608 may be similar in functionality to operations 302-308 as in FIG. 3.

At operation 610, the attack analyzer receives an alert from a detection engine monitoring the virtual machine. The alert indicates a type of vulnerability on the virtual machine and in this manner the alert corresponds to the virtual machine. Operation 610 may be similar in functionality to operation 310 as in FIG. 3.

At operation 612, the attack analyzer may determine whether the alert has been experienced previously by a networking system. In this operation, the attack analyzer analyzes the alert to determine whether the alert corresponds to existing alerts experienced by the networking system. In one implementation, the attack analyzer may track the various alerts experienced by the networking system and as such may include database of these alerts. The database may indicate the countermeasure for the attack analyzer to select based on if the alert is in the database. If the alert is has not been experienced previously (e.g., new alert), the method proceeds to operation 614 to determine the type of vulnerability corresponding to the alert received at operation 610. If the attack analyzer determines the alert has been experienced by the networking system, the method proceeds to operation 616 to select the countermeasure.

At operation 614, the attack analyzer processes the alert received at operation 610 to determine the type of vulnerability corresponding to the alert. The type of vulnerability denotes the state of the virtual machine. At operation 614, the attack analyzer determines the vulnerability associated with the alert and also the extent to which the virtual machine may have been compromised. Further, the attack analyzer then determines if the virtual machine is stable, vulnerable, exploited, and/or in a zombie state. For example, the types (i.e., states) of vulnerabilities may include stable, vulnerable, exploited, and/or zombie. Each of these types of vulnerabilities indicate whether the virtual machine has been compromised and to which extent. Based on the type of vulnerability determines which countermeasure may be selected by the attack analyzer. For example, for the stable alert, the attack analyzer may use the least intrusive countermeasure in the interaction of traffic to and from the virtual machine.

At operation 616, the attack analyzer selects the countermeasure. In this operation, the attack analyzer notifies a network controller to deploy the selected countermeasure at the virtual machine to counteract the vulnerability and/or attack at the virtual machine.

Figure 7:
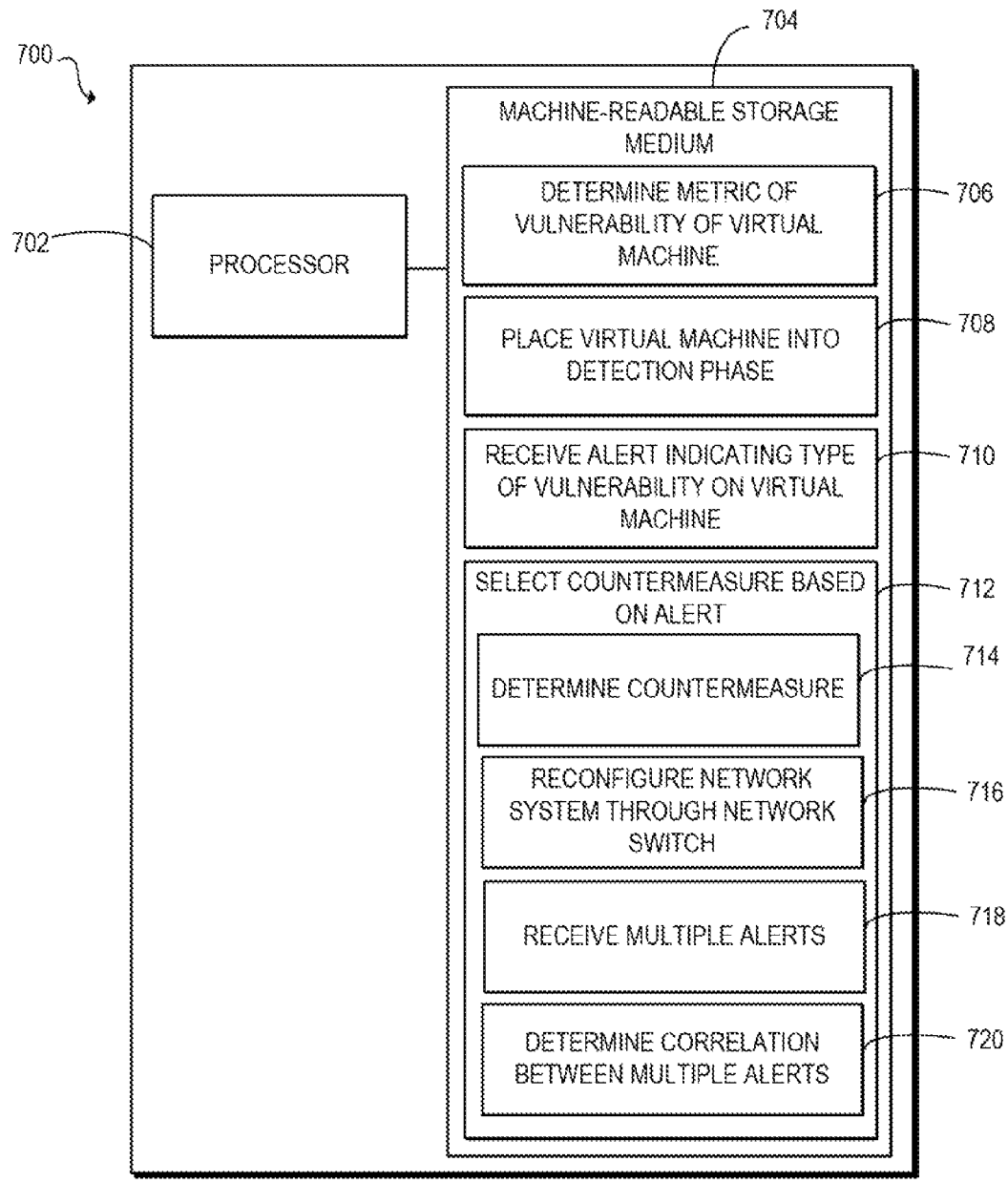
FIG. 7 is a block diagram of an example computing device with a processor to execute instructions in a machine-readable storage medium for determining a metric of vulnerability of a virtual machine and determining a correlation between multiple alerts in a networking system to predict a path of an attack among multiple virtual machines.

FIG. 7 is a block diagram of computing device 700 with a processor 702 to execute instructions 706-720 within a machine-readable storage medium 704. Specifically, the computing device 700 with the processor 702 is to determine a metric of vulnerability of a virtual machine and determine a correlation between multiple alerts in a networking system to predict a path of an attack among multiple virtual machines. Although the computing device 700 includes processor 702 and machine-readable storage medium 704, it may also include other components that would be suitable to one skilled in the art. For example, the computing device 700 may include the network controller 110 as in FIG. 1. The computing device 700 is an electronic device with the processor 702 capable of executing instructions 706-720, and as such embodiments of the computing device 700 include a computing device, mobile device, client device, personal computer, desktop computer, laptop, tablet, video game console, or other type of electronic device capable of executing instructions 706-720. The instructions 706-720 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory.

The processor 702 may fetch, decode, and execute instructions 706-720 to determine the metric of vulnerability to select a countermeasure, accordingly. In one implementation, once executing instructions 706-712, the processor may execute instructions 714-716. In another implementation, once executing instructions 706-712, the processor may execute instructions 718-720. Specifically, the processor 702 execute instructions 706-712 to: determine the metric of vulnerability of the virtual machine; based on the metric of vulnerability, place the virtual machine into a detection phase; receive an alert indicating a type of on the virtual machine; based on the received alert, select the countermeasure for implementation on the virtual machine. The processor 702 may then execute instructions 714-716 to: determine the countermeasure from multiple countermeasures; and reconfigure a network system through a network switch programmed for manipulating traffic to and from the virtual machine. The processor 702 may then execute instructions 718-720 to: receive multiple alerts, each alert corresponding to a different virtual machine; and determine a correlation between the multiple alerts to predict a path of the attacker among the multiple virtual machines.

The machine-readable storage medium 704 includes instructions 706-720 for the processor to fetch, decode, and execute. In another embodiment, the machine-readable storage medium 704 may be an electronic, magnetic, optical, memory, storage, flash-drive, or other physical device that contains or stores executable instructions. Thus, the machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 704 may include an application and/or firmware which can be utilized independently and/or in conjunction with the processor 702 to fetch, decode, and/or execute instructions of the machine-readable storage medium 704. The application and/or firmware may be stored on the machine-readable storage medium 704 and/or stored on another location of the computing device 700.

In summary, examples disclosed herein provide an efficient infrastructure to identify vulnerable virtual machines within a networking system to prevent these machines from being compromised. Additionally, the examples disclosed herein strengthen security by countering attempts to compromise the vulnerable virtual machines.

We claim:

1. A network system comprising:
an attack analyzer to:
assign a metric of vulnerability to a first virtual machine, the metric of vulnerability indicating a likelihood of attack on the first virtual machine, and the metric of vulnerability assigned based on connections of the first virtual machine to other virtual machines,
in response to the metric of vulnerability, cause the first virtual machine to enter a detection phase,
receive an alert corresponding to the first virtual machine, the alert generated responsive to monitoring performed by the detection phase, and
select a countermeasure based on the received alert; and
a network controller to:
implement the selected countermeasure.

2. The network system of claim 1 further comprising:
a detection engine to:
monitor traffic in and out of the first virtual machine during the detection phase; and
generate the alert indicating a type of vulnerability of the first virtual machine.

3. The network system of claim 2 wherein:
the network controller is further to initiate the detection engine to scan the first virtual machine for vulnerability information; and
the attack analyzer is further to receive the vulnerability information to assign the metric of vulnerability.

4. The network system of claim 1 further comprising:
a network switch to reconfigure the network system by isolating the first virtual machine, wherein the selected countermeasure comprises programming the network switch to isolate the first virtual machine.

5. The network system of claim 1, wherein the attack analyzer is to cause the first virtual machine to enter the detection phase in response to the metric of vulnerability reaching a specified threshold.

6. The network system of claim 1, wherein the alert indicates a type of vulnerability of a plurality of types of vulnerabilities, and the attack analyzer is to:
select a first type of countermeasure in response to the alert indicating a first type of vulnerability corresponding to the first virtual machine; and
select a second, different type of countermeasure in response to the alert indicating a second, different type of vulnerability corresponding to the first virtual machine.

7. The network system of claim 6, wherein the first type of countermeasure comprises one of diverting traffic away from the first virtual machine, filtering packets of the first virtual machine, modifying an address of packets of the first virtual machine, and blocking a port associated with the first virtual machine, and
the second type of countermeasure comprises programming a network switch to isolate the first virtual machine.

8. The network system of claim 1, wherein the selecting of the countermeasure comprises:
calculating a benefit of each respective countermeasure of a plurality of countermeasures;
selecting a countermeasure from the plurality of countermeasures based on the calculated benefits of the plurality of countermeasures.

9. The network system of claim 1, wherein the attack analyzer is to change the metric of vulnerability assigned to the first virtual machine in response to the selected countermeasure.

10. A non-transitory machine-readable storage medium encoded with instructions that when executed cause a system to:
determine a metric of vulnerability corresponding to a first virtual machine, the metric of vulnerability being a likelihood of attack on the first virtual machine, and the metric of vulnerability determined based on connections of the first virtual machine to other virtual machines;
place the first virtual machine into a detection phase in response to the metric of vulnerability;
receive an alert indicating a type of vulnerability on the first virtual machine, the alert generated responsive to monitoring of traffic into and out of the first virtual machine during the detection phase; and
select a countermeasure based on the alert.

11. The non-transitory machine-readable storage medium of claim 10, wherein the selecting of the countermeasure comprises:
determining a preferred countermeasure based on a benefit of the selected countermeasure to the first virtual machine, wherein the benefit of the selected countermeasure to the first virtual machine is based on a cost of the selected countermeasure and an intrusiveness of the selected countermeasure on the first virtual machine.

12. The non-transitory machine-readable storage medium of claim 10, wherein the selecting of the countermeasure comprises:
receive multiple alerts, each alert of the multiple alerts corresponding to a different virtual machine; and
determine a correlation between the multiple alerts for predicting a path of an attack among multiple virtual machines.

13. The non-transitory machine-readable storage medium of claim 10, wherein the selecting of the countermeasure comprises:
reconfiguring a network system by manipulating traffic flow to and from the first virtual machine through a network switch.

14. The non-transitory machine-readable storage medium of claim 10, wherein the selecting of the countermeasure comprises:
selecting a first type of countermeasure in response to the alert indicating a first type of vulnerability corresponding to the first virtual machine; and
selecting a second, different type of countermeasure in response to the alert indicating a second, different type of vulnerability corresponding to the first virtual machine.

15. A method comprising:
assigning, by a system including a processor, a metric of vulnerability to a first virtual machine, the metric of vulnerability assigned based on connections of the first virtual machine to other virtual machines;
placing, by the system, the first virtual machine into a detection phase based on the metric of vulnerability;
receiving, by the system, an alert corresponding to the first virtual machine, the alert generated responsive to monitoring of the first virtual machine performed by the detection phase; and
selecting, by the system, a countermeasure based on the received alert; and
implementing, by the system, the selected countermeasure.

16. The method of claim 15 further comprising:
determining a benefit of the selected countermeasure based on the assigned metric of vulnerability to the first virtual machine.

17. The method of claim 15 wherein placing the first virtual machine into the detection phase comprises:
analyzing traffic in and out of the first virtual machine; and
determining whether the first virtual machine is compromised.

18. The method of claim 15 further comprising:
reassigning a metric of vulnerability to the virtual machine based on the selected countermeasure.

19. The method of claim 15 wherein assigning the metric of vulnerability to the first virtual machine comprises:
calculating a probability of an attack on the first virtual machine.

20. The non-transitory machine-readable storage medium of claim 14, wherein the first type of countermeasure comprises one of diverting traffic away from the first virtual machine, filtering packets of the first virtual machine, modifying an address of packets of the first virtual machine, and blocking a port associated with the first virtual machine, and
the second type of countermeasure comprises programming a network switch to isolate the first virtual machine.

* * * * *